(12) United States Patent
Yeh et al.

(10) Patent No.: US 11,314,797 B2
(45) Date of Patent: Apr. 26, 2022

(54) DATA DE-IDENTIFICATION APPARATUS AND METHOD

(71) Applicant: Institute For Information Industry, Taipei (TW)

(72) Inventors: Yu-Hui Yeh, Taipei (TW); Tsun Ku, Taipei (TW); Ping-Che Yang, Taipei (TW); I-Ying Lu, Taipei (TW); Chih-Shan Luo, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 230 days.

(21) Appl. No.: 16/706,657

(22) Filed: Dec. 6, 2019

(65) Prior Publication Data
US 2021/0149934 A1 May 20, 2021

(30) Foreign Application Priority Data
Nov. 14, 2019 (TW) .................. 108141399

(51) Int. Cl.
*G06F 16/335* (2019.01)
*G06F 21/60* (2013.01)
(Continued)

(52) U.S. Cl.
CPC ........ *G06F 16/335* (2019.01); *G06F 16/3331* (2019.01); *G06F 21/602* (2013.01); *G06F 21/6254* (2013.01)

(58) Field of Classification Search
CPC .. G06F 16/335; G06F 21/602; G06F 21/6254; G06F 16/3331; G06F 16/21; G06F 16/285; G06F 21/6218
See application file for complete search history.

(56) References Cited

U.S. PATENT DOCUMENTS 11,036,886 B2 * 6/2021 Gkoulalas-Divanis ...................... G06F 21/602
2005/0192830 A1 9/2005 Pugh et al.
(Continued)

FOREIGN PATENT DOCUMENTS

WO 2017187207 A1 11/2017

OTHER PUBLICATIONS

Office Action to the corresponding Taiwan Patent Application rendered by the Taiwan Intellectual Property Office (TIPO) dated Jul. 14, 2020, 15 pages (including English translation).

*Primary Examiner* — Albert M Phillips, III
(74) *Attorney, Agent, or Firm* — Birch, Stewart, Kolasch & Birch, LLP (57) ABSTRACT

A data de-identification apparatus and method are provided. The data de-identification apparatus stores a data set of a first industry, wherein the data set is defined with a plurality of fields. The data de-identification apparatus receives a first instruction and a second instruction, wherein the first instruction corresponds to a second industry and the second instruction corresponds to a use of data. The data de-identification apparatus determines an identification category for each of the fields according to the first industry, the second industry, and the use of data. The data de-identification apparatus transforms the data set into a transformed data set according to the use of data and then transforms the transformed data set into a de-identification data set according to the identification categories.

20 Claims, 5 Drawing Sheets

(51) Int. Cl.
    *G06F 21/62*      (2013.01)
    *G06F 16/33*      (2019.01)

(56)                References Cited

U.S. PATENT DOCUMENTS

| | | |
|---|---|---|
| 2018/0256041 A1 | 9/2018 | Dormer et al. |
| 2019/0026490 A1* | 1/2019 | Ahmed .................. G06F 16/23 |
| 2019/0110736 A1 | 4/2019 | Broderick et al. |
| 2019/0228183 A1* | 7/2019 | Choi .................. G06F 21/6254 |
| 2019/0295544 A1 | 9/2019 | Garcia et al. |

* cited by examiner

FIG. 1A

| | Name | Birthday | ID number | Model of mobile phone | Address information |
|---|---|---|---|---|---|
| Ra | Xiaoxian Lin | 1984/8/29 | B123456789 | Samsung Note 8 | No.100, Section 4, Minsheng East Road, Songshan District, Taipei City |
| | ...... | ...... | ...... | ...... | ...... |
| Rz | Daming Chen | 1998/2/1 | J987654321 | Apple iPhone 11 | No.2, Siwei 3rd Road, Lingya District, Kaohsiung City |

Columns: A1, A2, A3, A4, A5; Table: D

FIG. 1B

| | Name | Birthday | ID number | Model of mobile phone | Address information |
|---|---|---|---|---|---|
| | A1 | A2 | A3 | A4 | A5 |
| Ra | Xiaoxian Lin | 1984/8/29 | B123456789 | NT $13,000 | NT $15,000,000 |
| | ...... | ...... | ...... | ...... | ...... |
| Rz | Daming Chen | 1998/2/1 | J987654321 | NT $25,000 | NT $5,000,000 |

| | Name | Birthday | ID number | Model of mobile phone | Address information |
|---|---|---|---|---|---|
| Ra | ○xian Lin | 1984 | — | NT $13,000 | NT $15,000,000 |
| | ...... | ...... | ...... | ...... | ...... |
| Rz | ○ming Chen | 1998 | — | NT $25,000 | NT $5,000,000 |

DATA DE-IDENTIFICATION APPARATUS AND METHOD

PRIORITY

This application claims priority to Taiwan Patent Application No. 108141399 filed on Nov. 14, 2019, which is hereby incorporated by reference in its entirety.

FIELD

The present invention relates to a data de-identification apparatus and method. More specifically, the present invention relates to a data de-identification apparatus and method based on industries and use of data.

BACKGROUND

With the advent of the big data era, more and more enterprises collect various kinds of data for analysis and then make business decisions based on analysis results (e.g., a banker decides whether to grant a credit loan to a user based on the deposit and consumption behavior of the user). However, the scope of the data owned by an enterprise is quite limited, and, thus, integrating data across different fields to make more accurate decisions and create more value is the trend. As the data analyzed by enterprises often have personal identities (e.g., names) or other information that needs to be protected (e.g., addresses and incomes), data de-identification has to be performed in order to conform with the norms in different fields (which is referred to as "legal compliance" for short) when integrating data across fields. Thereby, infringement of personal rights of the owners of personal information and violation of relevant financial regulations can be avoided.

Conventional data de-identification technologies mainly delete, encrypt, or superordinate directly identifiable data (e.g., names, ID numbers) or display only a part of data (e.g., some digits of numerical values). However, data derived by the aforesaid processing methods usually cannot be utilized for evaluating specific usages (e.g., evaluating whether to grant credit loans to users). All of these conventional data de-identification technologies have not considered the need of cross-field legal compliance when integrating data across fields and have not considered the need of achieving technical effects of data enabling (i.e., the data still can be utilized for evaluating specific usages after de-identification) while achieving compliance. Accordingly, there is an urgent need for a data de-identification technology that achieves both cross-field data integration and cross-field legal compliance.

SUMMARY

Provided is a data de-identification apparatus. The data de-identification apparatus may comprise a storage, an input interface, and a processor, wherein the processor is electrically connected to the storage and the input interface. The storage stores a data set in a first industry, wherein the data set is defined with a plurality of fields. The input interface receives a first instruction and a second instruction, wherein the first instruction corresponds to a second industry and the second instruction corresponds to a use of data. The processor determines an identification category of each of the fields according to the first industry, the second industry, and the use of data, transforms the data set into a first transformed data set according to the use of data, and transforms the first transformed data set into a first de-identification data set according to the identification categories.

Also provided is a data de-identification method, which is adapted for use in an electronic computing apparatus. The electronic computing apparatus stores a data set in a first industry, wherein the data set is defined with a plurality of fields. The data de-identification method may comprise: (a) receiving a first instruction, wherein the first instruction corresponds to a second industry, (b) receiving a second instruction, wherein the second instruction corresponds to a use of data, (c) determining an identification category of each of the fields according to the first industry, the second industry, and the use of data, (d) transforming the data set into a first transformed data set according to the use of data, and (e) transforming the first transformed data set into a first de-identification data set according to the identification categories.

The data de-identification technology (at least including the apparatus and the method) transforms a data set of a certain industry according to a use of data and performs de-identification on the data set according to at least two industries and the use of data. The data set derived after performing the aforementioned transformation and de-identification has richer information that is more beneficial for the use of data, so the evaluation model established by using the data set derived after performing the aforementioned transformation and de-identification can make more accurate decisions and create more value. In addition, since the data de-identification technology takes the legal norms of the industries and use of data involved into consideration when performing de-identification, the data set derived after performing the aforementioned transformation and de-identification meets the cross-field regulations.

The detailed technology and preferred embodiments implemented for the subject invention are described in the following paragraphs accompanying the appended drawings for a person having ordinary skill in the art to well appreciate the features of the claimed invention.

DETAILED DESCRIPTION

In the following description, the data de-identification apparatus and method provided in the present invention will be explained with reference to certain example embodiments thereof. However, these example embodiments are not intended to limit the present invention to any specific environment, example, embodiment, applications, or implementations described in these example embodiments. Therefore, description of these example embodiments is only for purpose of illustration rather than to limit the scope of the present invention.

It should be appreciated that, in the following embodiments and the attached drawings, elements unrelated to the present invention are omitted from depiction. In addition, dimensions of and dimensional scales between individual elements in the attached drawings are provided only for ease of depiction and illustration, but not to limit the scope of the present invention.

Figure 1A:
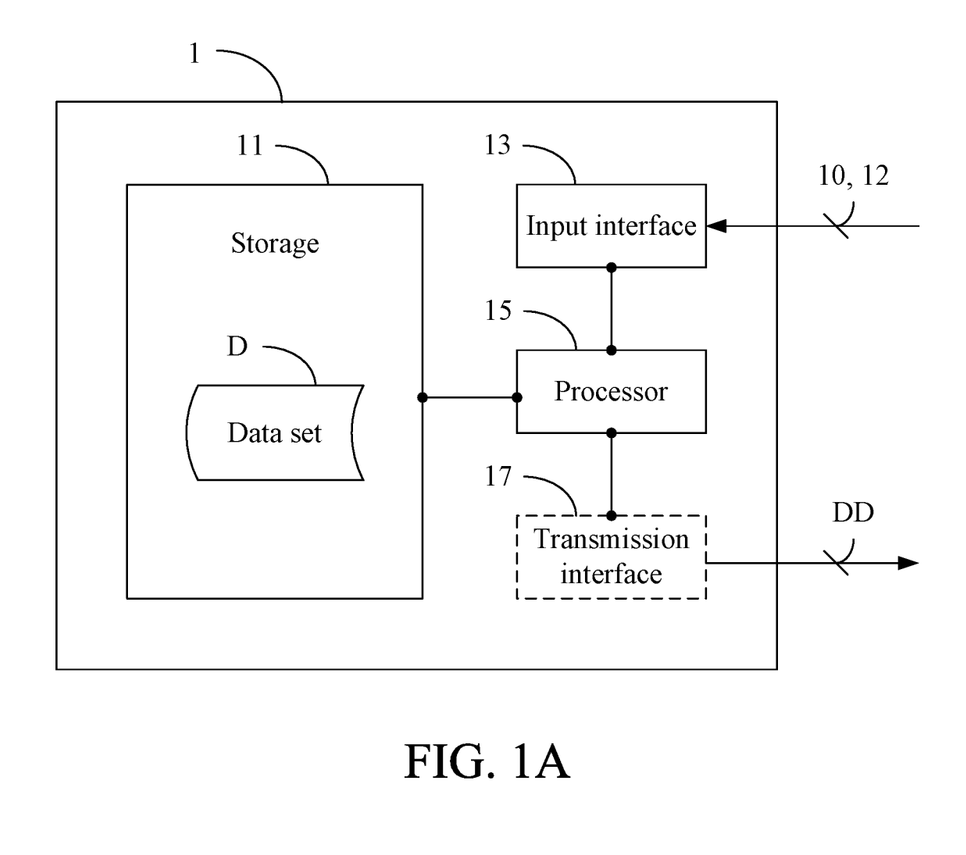
FIG. 1A depicts a schematic view of a data de-identification apparatus 1 according to a first embodiment.

A first embodiment of the present invention is a data de-identification apparatus 1, and a schematic view thereof is depicted in FIG. 1A. The data de-identification apparatus 1 comprises a storage 11, an input interface 13, and a processor 15, wherein the processor 15 is electrically connected to the storage 11 and the input interface 13. The storage 11 may be a memory, a Hard Disk Drive (HDD), a Universal Serial Bus (USB) disk, a Compact Disk (CD), or any other non-transitory storage medium or apparatus with similar functions and well-known to a person having ordinary skill in the art. The input interface 13 may be any interface that can be used by a user to input information, such as a mouse, a keyboard, and a touch display screen. The processor 15 may be one of various processors, a Central Processing Units (CPUs), Microprocessor Units (MPUs), Digital Signal Processors (DSPs), or any other computing apparatuses with similar functions and well-known to a person having ordinary skill in the art.

The data de-identification apparatus 1 performs data transformation (e.g., provides additional information based on the original data, which will be detailed later) and de-identification on a data set to be used for cross-field integration so that the processed data set has richer information and conforms to the legal norms of the integrated industries and the use of data (e.g., personal data protection law, banking law, and other relevant financial regulations, without being limited thereto).

In this embodiment, the storage 11 of the data de-identification apparatus 1 stores a data set D of a first industry (not shown). The data set D is defined with a plurality of fields and comprises a plurality of records, wherein each record comprises a plurality of pieces of data corresponding to the fields one-to-one. Please refer to FIG. 1B, which depicts a specific example of the data set D. This specific example will be used in the subsequent description, which, however, is not intended to limit the scope of the present invention. In this specific example, the data set D is defined with five fields A1, A2, A3, A4, and A5 and comprises a plurality of records Ra, . . . , Rz, wherein each of the records Ra, . . . , Rz comprises a plurality of pieces of data corresponding to the fields A1, A2, A3, A4, and A5 one-to-one.

The user may input an instruction 10 through the input interface 13, wherein the instruction 10 instructs the integration of the data set D with the data set of a second industry (not shown). In addition, the user may input an instruction 12 through the input interface 13, wherein the instruction 12 is used to instruct the use of the integrated data set for a use of data (not shown). The input interface 13 receives the aforesaid instructions 10 and 12 and transmits the instructions 10 and 12 to the processor 15 for subsequent processing.

In some embodiments, the data de-identification apparatus 1 may further comprise a display screen (not shown) that is electrically connected to the processor 15. The display screen may be a Liquid Crystal Display (LCD), an Organic Light Emitting Diode (OLED) screen, an electronic paper screen, or any other apparatus capable of displaying digital information. For those embodiments, the display screen may display options of a plurality of industries for the user to select, and the aforementioned instruction 10 is generated after the user selects one of the industries. In addition, the display screen may display options of a plurality of use of data for the user to select, and the aforementioned instruction 12 is generated after the user selects one of the use of data.

Figure 1B:
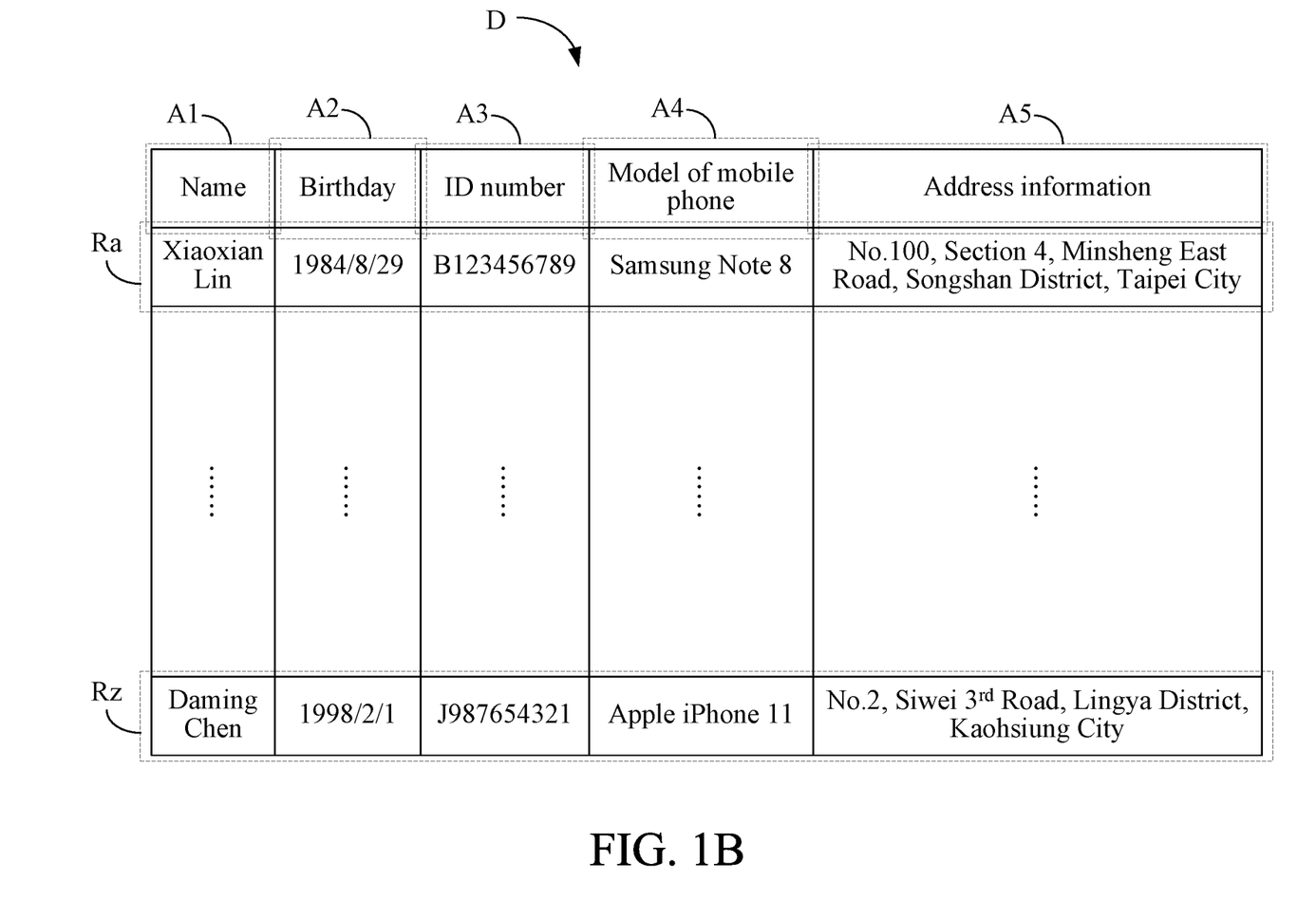
FIG. 1B depicts a specific example of a data set D.

Next, the processor 15 determines an identification category of each of the fields A1, A2, A3, A4, and A5 according to the first industry, the second industry, and the use of data. In this embodiment, the identification category of a field may be direct identification, indirect identification, or non-personal data. It shall be noted that different industries correspond to different legal norms, different use of data may also correspond to different legal norms, and different legal norms may permit personal data to be disclosed to different or the same degree. In other words, the identification category of the same field determined respectively by the above-mentioned first industry, second industry and use of data may be different or the same. In this embodiment, if different legal norms have different requirements regarding the identification category of the same field, the processor 15 will select the stricter one as the identification category of the field. In some embodiments, the storage 11 may store the identification categories of various fields regarding various legal norms in advance so that the processor 15 can quickly determine the identification category of each of the fields A1, A2, A3, A4, and A5 according to the first industry, the second industry, and the use of data. For better understanding, it is assumed that the processor 15 determines that the identification category of the field A1 is direct identification, the identification category of the field A2 is indirect identification, the identification category of the field A3 is direct identification, the identification category of the field A4 is non-personal data, and the identification category of the field A5 is direct identification.

Figure 1C:
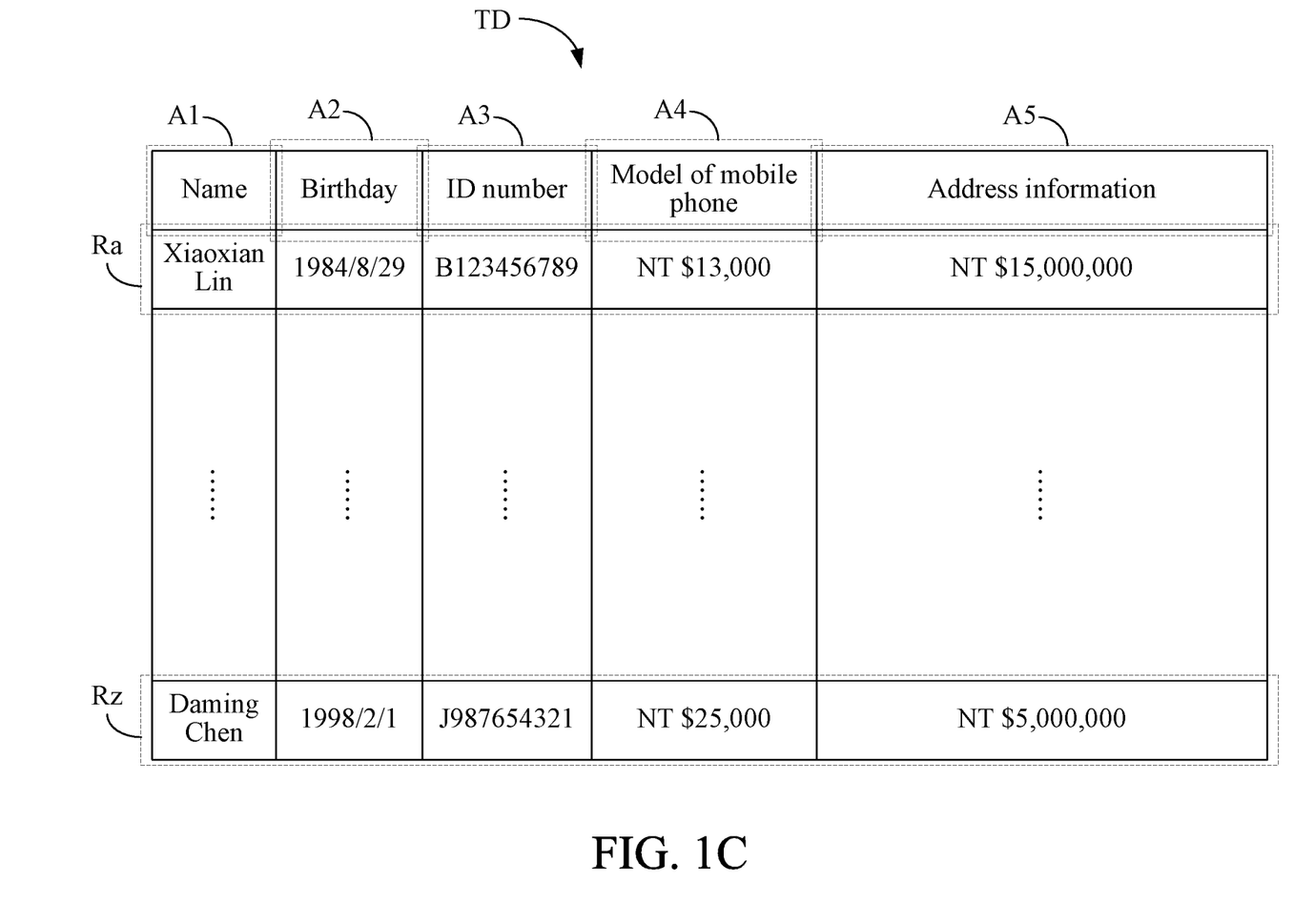
FIG. 1C depicts a specific example of a transformed data set TD.

Thereafter, the processor 15 transforms the data set D into the transformed data set TD according to the use of data and thereby imparts additional information related to the use of data to the transformed data set TD. In some embodiments, the processor 15 determines a data transformation method for each of one or more designated fields in the fields A1, A2, A3, A4 and A5 according to the use of data and then transforms a plurality of pieces of data corresponding to each designated field by the corresponding data transformation method. It shall be noted that the data transformation method corresponding to each designated field is used to transform the corresponding data into the data needed for the use of data, and the identification category of each designated field may be the same or may be changed after the transformation. In some embodiments, the storage 11 may store the data transformation method to be adopted by each use of data for each field in advance so that the processor 15 can quickly determine the data transformation method for each designated field according to a certain use of data.

For better understanding, please refer to a specific example of the transformed data set TD shown in FIG. 1C. This specific example will be used for the subsequent description, but it is not intended to limit the scope of the present invention. In the specific example, the use of data is credit evaluation. The processor 15 determines that the fields A4 and A5 are the designated fields according to the use of data and determines the data transformation method for each of the fields A4 and A5. Specifically, the processor 15 determines that the data transformation method of the field A4 is to transform the model of a mobile phone into the selling price of the mobile phone, and the processor 13 determines that the data transformation method of the field A5 is to transform the address into the average house price in the market. In this specific example, after the data in the field A4 is transformed by the corresponding data transformation method, the identification category of field A4 remains unchanged. However, after the data in the field A5 is transformed by the corresponding data transformation method, the identification category of the field A5 is changed from direct identification into non-personal data.

In another specific example, the processor 15 determines that the data transformation method of the field A4 is to transform the model of the mobile phone into a consumption level, and the identification category of the field A4 remains unchanged after the data corresponding to the field A4 is transformed by the aforesaid data transformation method. The processor 15 further determines that the data transformation method of the field A5 is to transform the address into an asset class, and the identification category of the field A5 is changed from direct identification into non-personal data after the data corresponding to the field A5 is transformed by the aforesaid data transformation method.

Figure 1D:
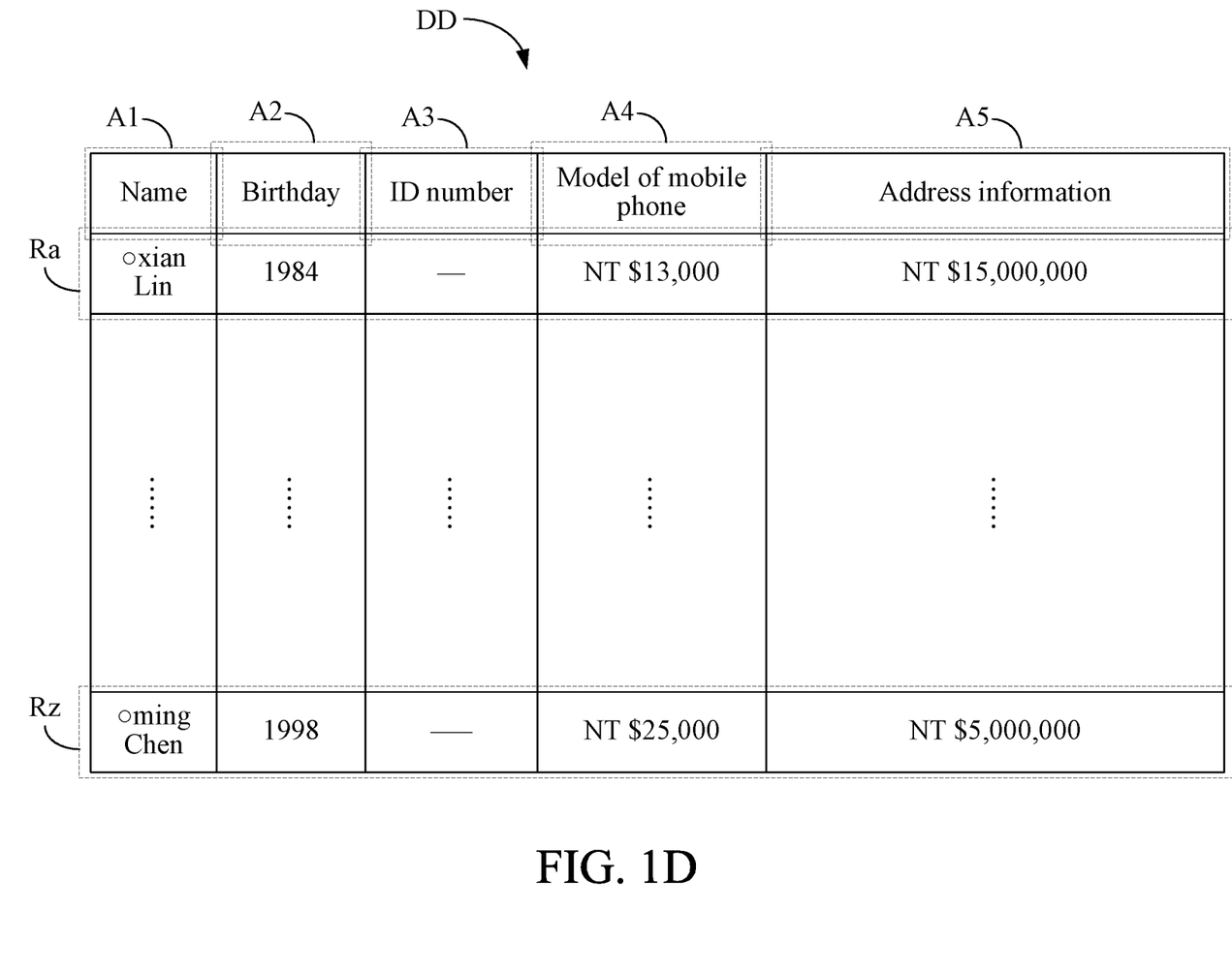
FIG. 1D depicts a specific example of a de-identification data set DD.

Thereafter, the processor 15 transforms the transformed data set TD into the de-identification data set DD according to the identification categories. By doing so, information that can be used to identify individuals are removed and, hence, the legal norms corresponding to the first industry, the second industry, and the use of data are conformed. In some embodiments, the processor 15 determines the de-identification method for each of the fields A1, A2, A3, A4, and A5 according to the corresponding identification category and performs de-identification on a plurality of pieces of data corresponding to each of the fields A1, A2, A3, A4, and A5 in the transformed data set TD according to the corresponding de-identification method. It shall be noted that whether the de-identification methods corresponding to the fields A1, A2, A3, A4, and A5 should be the same or different is not limited by the present invention. In other words, the de-identification methods corresponding to some fields may be the same. It is noted that, in some embodiments, the processor 15 does not determine a de-identification method for a field whose identification category is non-personal data (i.e., de-identification is not required). In some embodiments, the storage 11 may store the de-identification methods to be adopted for various identification categories of the fields in advance so that the processor 15 can quickly determine the de-identification method of each of the fields A1, A2, A3, A4, and A5.

For better understanding, please refer to a specific example of a de-identification data set DD shown in FIG. 1D. This specific example will be used for subsequent description, but please note that it is not intended to limit the scope of the present invention. In this specific example, the identification category of the field A1 is direct identification, and the processor 15 determines that the de-identification method corresponding to the field A1 is to delete part of the information (e.g., to delete a part of the name). The identification category of the field A2 is indirect identification, and the processor 15 determines that the de-identification method corresponding to the field A2 is to delete part of the information (e.g., to delete the month and date of a birthday and only retain the year of the birthday). The identification category of the field A3 is direct identification, and the processor 15 determines that the de-identification method corresponding to the field A3 is to delete all the information. The identification category of the field A4 is non-personal data, and the processor 15 determines that the de-identification method corresponding to the field A4 is not to perform any transformation. The identification category of the field A5 has been changed into non-personal data after the aforementioned data transformation, and the processor 15 determines that the de-identification method corresponding to the field A5 is not to perform any transformation.

It shall be noted that in some embodiments, the processor 15 further determines a confidentiality category of each of the fields A1, A2, A3, A4, and A5 according to the first industry, the second industry, and the use of data in addition to determining the identification category of each of the fields A1, A2, A3, A4 and A5 according to the first industry, the second industry, and the use of data. The confidentiality category of each field may be being sensitive or non-sensitive. Similarly, different industries correspond to different legal norms, and different use of data may also correspond to different legal norms. Thus, the confidentiality category of the same field determined respectively by the above-mentioned first industry, second industry, and use of data may be different or the same. If different legal norms have different requirements for the confidentiality category of the same field, the processor 15 will select the stricter requirement as the confidentiality category of the field. In these embodiments, the processor 15 transforms the transformed data set TD into the de-identification data set DD according to the identification categories and the confidentiality categories of the fields A1, A2, A3, A4, and A5. Taking the field A3 as an example, the identification category thereof is direct identification and the confidentiality category thereof is being sensitive. The processor 15 may determine which one of the two categories has stricter requirement in terms of de-identification and then adopt the de-identification method corresponding to the category that has the stricter requirement for processing and transformation (for example, the de-identification degree corresponding to direct identification is stricter, so the de-identification method corresponding to direct identification is adopted). How the processor 15 transforms the transformed data set TD into the de-identification data set DD according to the identification categories and the confidentiality categories of the fields A1, A2, A3, A4, and A5 shall be appreciated by a person having ordinary skill in the art based on the above description and, thus, will not be further described herein.

In some embodiments, the processor 15 further performs a de-identification check (not shown) on the de-identification data set DD and thereby determines whether the de-identification data set DD indeed conforms to the legal norms corresponding to the first industry, the second industry, and the use of data. For example, the de-identification check may comprise at least one of a K-Anonymity check, an L-Diversity check, and a T-Closeness check, without being limited thereto.

In some embodiments, the processor 15 further determines an order of importance of the fields A1, A2, A3, A4, and A5 according to the use of data. In these embodiments, if the processor 15 determines that the de-identification data set DD fails the de-identification check, the processor 15 may further determine at least one field comprised in the de-identification data set DD according to the order of importance to perform an advanced de-identification (not shown). The de-identification check will be performed again after the advanced de-identification to determine whether the de-identification data set DD after the advanced de-identification indeed conform to the legal norms corresponding to the first industry, the second industry, and the use of data. In these embodiments, there may be one or more de-identification methods on the same identification category for the same field, and these de-identification methods may have different levels. For the field requiring advanced de-identification, the processor 15 selects a stricter de-identification method from the de-identification methods corresponding to the field to perform advanced de-identification.

For better understanding, a specific example is provided for illustration. However, please note that the specific example is not intended to limit the scope of the present invention. In the specific example, based on the use of data, the processor 15 determines that the order of importance of the fields is arranged as follows, the field A4, the field A5, the field A3, the field A2, and the field A1. The processor 15 then determines that the field A1 in the de-identification data set DD will be subjected to advanced de-identification according to the order of importance (for example, the less important field will be selected first to be processed). In this specific example, it is assumed that the identification category of the field A1 is direct identification, and there are three corresponding de-identification methods in different levels. Specifically, the first level is to delete one word in the name, the second level is to delete multiple words in the name, and the third level is to replace the name by other code. The processor 15 originally selects the de-identification method of the first level to perform de-identification on the data corresponding to the field A1. Since the processor 15 determines that the de-identification data set DD fails the de-identification check and selects the field A1 for advanced de-identification, the processor 15 selects the de-identification method of the second level or the third level corresponding to the field A1 to perform advanced de-identification on the data corresponding to the field A1.

Based on the above description, a person having ordinary skill in the art shall appreciate that the processor 15 may perform the aforementioned de-identification check again after performing the advanced de-identification on the de-identification data set DD so as to determine whether the data set subjected to the advanced de-identification indeed conforms to the legal norms corresponding to the first industry, the second industry, and the use of data. Thus, the details will not be repeated herein.

In some embodiments, after the de-identification data set DD is generated, the processor 15 may further use an autoencoder to retrieve a plurality of feature values (not shown) from the de-identification data set DD and then estimates the model performance (not shown) on the de-identification data set DD for the use of data by using the feature values. For example, when the use of data is to evaluate the credit rating of a loan applicant, the de-identification data set DD will be used to establish a credit rating classification model, and the modeling performance may be a classification accuracy of the credit rating classification model. In these embodiments, if the processor 15 determines that the modeling performance is lower than a threshold value, the processor 15 may further transform the data set D into another transformed data set (not shown) according to the use of data. That is, imparting other additional information related to the use of data to the another transformed data set by other transformation method, and the other additional information will improve the modeling performance of the subsequent regenerated de-identification data set DD. Specifically, the processor 15 determines a data transformation method of a designated field of the fields A1, A2, A3, A4, and A5 according to the use of data. In addition, when the processor 15 transforms the data set D into the transformed data set TD and transforms the data set D into another transformed data set, the processor 15 uses different data transformation methods to transform the data corresponding to the specified field so that the data in the another transformed data set can satisfy the requirements of the use of data more (e.g., more beneficial to the evaluation of credit rating).

Similarly, after generating another transformed data set, the processor 15 further transforms the another transformed data set into a de-identification data set according to the identification categories corresponding to the fields A1, A2, A3, A4, and A5 as described above. Thus, the details will not be repeated herein.

In some embodiments, the data de-identification apparatus 1 may further comprise a transmission interface 17 that is electrically connected to the processor 15. The transmission interface 17 may be any wired or wireless interface capable of transmitting and receiving signals and data, e.g., various network interfaces, without being limited thereto. The transmission interface 17 transmits the de-identification data set DD to a model construction apparatus (not shown). After receiving the de-identification data set DD, the model construction apparatus may establish an evaluation model corresponding to the use of data. In other embodiments, the model construction apparatus may also receive a plurality of de-identification data sets from different industries for modeling. For example, in addition to receiving the aforementioned de-identification data set DD, the model construction apparatus may also receive another de-identification data set (which may be generated after processing the data set in the second industry in the aforementioned manner) of the corresponding second industry, and then use the two different de-identification data sets to establish an evaluation model corresponding to the use of data.

According to the above description, the data de-identification apparatus 1 transforms a data set in a certain industry according to a use of data (e.g., provide additional information of other industries based on the original data) and performs de-identification on the data set according to at least two industries and the use of data. The data set after the aforementioned transformation and de-identification has richer information that is more beneficial for the use of data, so the evaluation model established by using the data set derived after performing the aforementioned transformation and de-identification can make more accurate decisions and create more value. In addition, since the data de-identification apparatus 1 takes the legal norms of the industries and use of data involved into consideration when performing de-identification, the data set derived after performing the aforementioned transformation and de-identification meets cross-field regulations.

Figure 2:
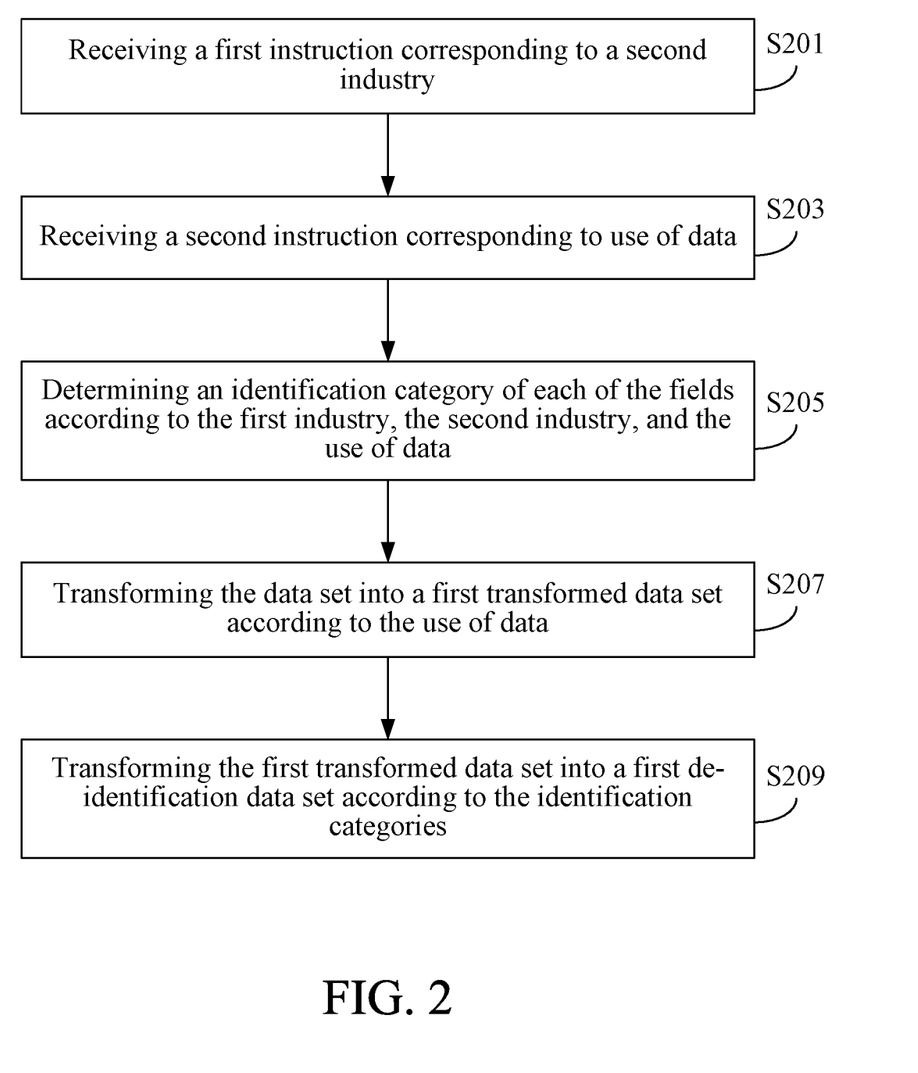
FIG. 2 depicts a main flowchart of a data de-identification method according to a second embodiment.

A second embodiment of the present invention is a data de-identification method, and a main flowchart thereof is depicted in FIG. 2. The data de-identification method is adapted for use in an electronic computing apparatus (e.g., the aforementioned data de-identification apparatus 1), and the electronic computing apparatus stores a data set in a first industry. The data set is defined with a plurality of fields and comprises a plurality of records, wherein each record individually comprises a plurality of pieces of data corresponding to the fields one-to-one. The data de-identification method comprises steps S201 to S209.

In the step S201, the electronic computing apparatus receives a first instruction, wherein the first instruction corresponds to a second industry. In the step S203, the electronic computing apparatus receives a second instruction, wherein the second instruction corresponds to a use of data. It shall be noted that the order that the steps S201 and S203 are executed is not limited by the present invention. In other words, the step S201 may be executed earlier or later than the step S203, or the step S201 may be executed simultaneously with the step S203.

Next, in the step S205, the electronic computing apparatus determines an identification category of each of the fields according to the first industry, the second industry, and the use of data. In the step S207, the electronic computing apparatus transforms the data set into a first transformed data set according to the use of data. In the step S209, the electronic computing apparatus transforms the first transformed data set into a first de-identification data set according to the identification categories.

In some embodiments, the data de-identification method may further comprise a step of determining a confidentiality category (not shown) of each of the fields by the electronic computing apparatus according to the first industry, the second industry, and the use of data. In these embodiments, the step S209 transforms the first transformed data set into the first de-identification data set according to the identification categories and the confidentiality categories.

In some embodiments, the step S207 comprises a step of determining a data transformation method of a designated field by the electronic computing apparatus according to the use of data (not shown). The step S207 further comprises another step of transforming, by the electronic computing apparatus, a plurality of pieces of data corresponding to the designated field by the corresponding data transformation method (not shown).

In some embodiments, the step S209 comprises a step of determining a de-identification method for each of the fields by the electronic computing apparatus according to the identification category of the field. The step S209 further comprises another step of performing, by the electronic computing apparatus, de-identification on a plurality of pieces of data of each of the fields in the first transformed data set according to the corresponding de-identification method (not shown).

In some embodiments, the data de-identification method may further comprise a step of performing a de-identification check on the first de-identification data set by the electronic computing apparatus (not shown). For example, the de-identification check may comprise at least one of a K-Anonymity check, an L-Diversity check, and a T-Closeness check, without being limited thereto. In these embodiments, the data de-identification method may further comprise a step of determining an order of importance of the fields by the electronic computing apparatus according to the use of data (not shown). When the first de-identification data set fails the de-identification check, the data de-identification method may further comprise a step of determining, by the electronic computing apparatus, at least one field comprised in the first de-identification data set according to the order of importance to perform an advanced de-identification (not shown).

In some embodiments, the data de-identification method may further comprise a step of retrieving, by the electronic computing apparatus, a plurality of feature values from the first de-identification data set by an autoencoder (not shown) and another step of estimating, by the electronic computing apparatus, the model performance on the first de-identification data set for the use of data by using the feature values (not shown). In these embodiments, the data de-identification method may further execute a step of determining whether the model performance is lower than a threshold value by the electronic computing apparatus (not shown). If the model performance is lower than the threshold value, the data de-identification method may further comprise a step of transforming the data set into a second transformed data set according to the use of data by the electronic computing apparatus (not shown) and a step of transforming the second transformed data set into a second de-identification data set according to the identification categories by the electronic computing apparatus (not shown). The data de-identification method uses different data transformation methods to transform a plurality of pieces of data corresponding to the designated field when transforming the first transformed data set and the second transformed data set.

In some embodiments, the data de-identification method may further comprise a step of transmitting the first de-identification data set to a model construction apparatus by the electronic computing apparatus (not shown). The model construction apparatus establishes an evaluation model corresponding to the use of data after receiving the first de-identification data set and a third de-identification data set corresponding to the second industry.

In addition to the aforesaid steps, the second embodiment can also execute all the operations and steps that can be executed by the data de-identification apparatus 1 set forth in the aforesaid embodiments, have the same functions, and deliver the same technical effects as the aforesaid embodiments. How the second embodiment executes these operations and steps, has the same functions, and delivers the same technical effects as the aforesaid embodiments will be readily appreciated by a person having ordinary skill in the art based on the explanation of the aforesaid embodiments. Thus, the details will not be repeated herein.

It shall be appreciated that, in the specification and the claims of the present invention, some words (including instruction, industry, transformed data set, de-identification data set) are preceded by the terms "first," "second," or "third," and these terms "first," "second," and "third" are only used to distinguish these words.

According to the above descriptions, the data de-identification technology (at least including the apparatus and the method) provided by the present invention transforms a data set of a certain industry according to a use of data (e.g., provide additional information of other industries based on the original data) and performs de-identification on the data set according to at least two industries and the use of data. The data set after the aforementioned transformation and de-identification has richer information that is more beneficial for the use of data, so the evaluation model established by using the data set derived after performing the aforementioned transformation and de-identification can make more accurate decisions and create more value. In addition, since the data de-identification technology provided by the present invention takes the legal norms of the industries and use of data involved into consideration when performing de-identification, the data set derived after performing the aforementioned transformation and de-identification meets cross-field regulations.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A data de-identification apparatus, comprising:
   a storage, being configured to store a data set of a first industry, wherein the data set is defined with a plurality of fields;

an input interface, being configured to receive a first instruction and a second instruction, wherein the first instruction corresponds to a second industry, and the second instruction corresponds to a use of data; and a processor, being electrically connected to the storage and the input interface, and being configured to determine an identification category of each of the fields according to the first industry, the second industry, and the use of data, transform the data set of the first industry into a first transformed data set according to the use of data, and transform the first transformed data set into a first de-identification data set according to the identification categories;

wherein the processor further retrieves a plurality of feature values from the first de-identification data set, and the processor further estimates, by using the feature values, a classification accuracy of the first de-identification data set applied for the use of data.

2. The data de-identification apparatus of claim 1, wherein the processor further determines a confidentiality category of each of the fields according to the first industry, the second industry, and the use of data, wherein the processor transforms the first transformed data set into the first de-identification data set according to the identification categories and the confidentiality categories.

3. The data de-identification apparatus of claim 1, wherein the processor transforms the data set into the first transformed data set by the following operations: determining a data transformation method of a designated field according to the use of data and transforming a plurality of pieces of data corresponding to the designated field by the data transformation method.

4. The data de-identification apparatus of claim 1, wherein the processor transforms the first transformed data set into the first de-identification data set by the following operations: determining a de-identification method for each of the fields according to the corresponding identification category and performing de-identification on a plurality of pieces of data of each of the fields in the first transformed data set according to the corresponding de-identification method.

5. The data de-identification apparatus of claim 1, wherein the processor further performs a de-identification check on the first de-identification data set.

6. The data de-identification apparatus of claim 5, wherein the de-identification check comprises at least one of a K-Anonymity check, an L-Diversity check, and a T-Closeness check.

7. The data de-identification apparatus of claim 5, wherein the processor further determines an order of importance of the fields according to the use of data, wherein when the processor further determines that the first de-identification data set fails the de-identification check, the processor further determines at least one field comprised in the first de-identification data set according to the order of importance to perform an advanced de-identification.

8. The data de-identification apparatus of claim 1, wherein the processor retrieves the plurality of feature values from the first de-identification data set by an autoencoder, and the processor further estimates the model performance on the first de-identification data set for the use of data by using the feature values.

9. The data de-identification apparatus of claim 8, wherein when the model performance is lower than a threshold value, the processor further transforms the data set into a second transformed data set according to the use of data and transforms the second transformed data set into a second de-identification data set according to the identification categories, wherein the processor determines a data transformation method of a designated field in the fields according to the use of data, and the processor uses different data transformation methods to transform a plurality of pieces of data corresponding to the designated field when transforming the first transformed data set and the second transformed data set.

10. The data de-identification apparatus of claim 1, further comprising:

a transmission interface, being electrically connected to the processor and being configured to transmit the first de-identification data set to a model construction apparatus;

wherein the model construction apparatus establishes an evaluation model corresponding to the use of data after receiving the first de-identification data set and a third de-identification data set corresponding to the second industry.

11. A data de-identification method, being adapted for use in an electronic computing apparatus, the electronic computing apparatus storing a data set of a first industry, the data set being defined with a plurality of fields, the data de-identification method comprising:

(a) receiving a first instruction, wherein the first instruction corresponds to a second industry;

(b) receiving a second instruction, wherein the second instruction corresponds to a use of data;

(c) determining an identification category of each of the fields according to the first industry, the second industry, and the use of data;

(d) transforming the data set of the first industry into a first transformed data set according to the use of data; and (e) transforming the first transformed data set into a first de-identification data set according to the identification categories;

(f) retrieving a plurality of feature values from the first de-identification data set, and further estimating, by using the feature values, a classification accuracy of the first de-identification data set applied for the use of data.

12. The data de-identification method of claim 11, further comprising:

determining a confidentiality category of each of the fields according to the first industry, the second industry, and the use of data;

wherein the step (e) transforms the first transformed data set into the first de-identification data set according to the identification categories and the confidentiality categories.

13. The data de-identification method of claim 11, wherein the step (d) comprises:

determining a data transformation method of a designated field according to the use of data; and transforming a plurality of pieces of data corresponding to the designated field by the data transformation method.

14. The data de-identification method of claim 11, wherein the step (e) comprises:

determining a de-identification method for each of the fields according to the corresponding identification category; and performing de-identification on a plurality of pieces of data of each of the fields in the first transformed data set according to the corresponding de-identification method.

15. The data de-identification method of claim 11, further comprising:

performing a de-identification check on the first de-identification data set.

16. The data de-identification method of claim 15, wherein the de-identification check comprises at least one of a K-Anonymity check, an L-Diversity check, and a T-Closeness check.

17. The data de-identification method of claim 15, further comprising:
    determining an order of importance of the fields according to the use of data;
    determining at least one field comprised in the first de-identification data set according to the order of importance to perform an advanced de-identification when the first de-identification data set fails the de-identification check.

18. The data de-identification method of claim 11, further comprising:
    retrieving the plurality of feature values from the first de-identification data set by an autoencoder; and
    estimating the model performance on the first de-identification data set for the use of data by using the feature value.

19. The data de-identification method of claim 18, further comprising:
    determining that the modeling performance is lower than a threshold value;
    transforming the data set into a second transformed data set according to the use of data; and
    transforming the second transformed data set into a second de-identification data set according to the identification categories,
    wherein the data de-identification method determines a data transformation method of a designated field in the fields according to the use of data, and the data de-identification method uses different data transformation methods to transform a plurality of pieces of data corresponding to the designated field when transforming the first transformed data set and the second transformed data set.

20. The data de-identification method of claim 11, further comprising:
    transmitting the first de-identification data set to a model construction apparatus;
    wherein the model construction apparatus establishes an evaluation model corresponding to the use of data after receiving the first de-identification data set and a third de-identification data set corresponding to the second industry.

* * * * *